(12) United States Patent
Yadav et al.

(10) Patent No.: US 11,379,501 B2
(45) Date of Patent: Jul. 5, 2022

(54) HIERARCHICAL CLASSIFICATION OF TRANSACTION DATA

(71) Applicant: Yodlee, Inc., Redwood City, CA (US)

(72) Inventors: Chirag Yadav, Karnataka (IN); Divya James Athoopallil, Karnataka (IN); Ganesh Patil, Karnataka (IN); Rakesh Kumar Ranjan, Karnataka (IN); Aparajita Choudhury Karimpana, Karnataka (IN); Om Dadaji Deshmukh, Karnataka (IN)

(73) Assignee: Yodlee, Inc., San Mateo, CA (US)

( * ) Notice: Subject to any disclaimer, the term of this patent is extended or adjusted under 35 U.S.C. 154(b) by 751 days.

(21) Appl. No.: 15/728,461

(22) Filed: Oct. 9, 2017

(65) Prior Publication Data

US 2019/0108593 A1 Apr. 11, 2019

(51) Int. Cl.
*G06F 16/28* (2019.01)
*G06F 16/35* (2019.01)
*G06F 16/906* (2019.01)
*G06N 3/08* (2006.01)
*G06Q 40/00* (2012.01)
*G06N 3/04* (2006.01)

(52) U.S. Cl.
CPC .......... *G06F 16/285* (2019.01); *G06F 16/355* (2019.01); *G06F 16/906* (2019.01); *G06N 3/088* (2013.01); *G06Q 40/12* (2013.12)

(58) Field of Classification Search
None
See application file for complete search history.

(56) References Cited

U.S. PATENT DOCUMENTS

| 9,063,978 | B1* | 6/2015 | Kapoor | ............ G06F 16/24564 |
| 2010/0306032 | A1 | 12/2010 | Jolley | |
| 2011/0264612 | A1 | 10/2011 | Ryman-Tubb | |

(Continued)

OTHER PUBLICATIONS

PCT International Search Report and Written Opinion in International Appln. No. PCT/US2018/054865, dated Apr. 3, 2019, 9 pages.

(Continued)

*Primary Examiner* — Neveen Abel Jalil
*Assistant Examiner* — John J Morris
(74) *Attorney, Agent, or Firm* — Fish & Richardson P.C.

(57) ABSTRACT

Methods, systems and computer program products implementing hierarchical classification techniques are disclosed. A hierarchical classification system receives training data including labeled transaction records. The system determines tag sequences from the training data. The system clusters the tag sequences into clusters. The system determines a cluster-level classifier that is trained to predict a cluster for an input transaction record. The system determines a respective cluster-specific classifier for each cluster. The system trains the cluster-specific classifier to predict a label of entity of interest for an input transaction record, given a particular cluster. Upon receiving a test transaction record, the system first applies the cluster-level classifier to determine a particular cluster for the test transaction record, and then determines a label of entity of interest of the test transaction record by applying a cluster-specific classifier of that particular cluster.

20 Claims, 5 Drawing Sheets

(56) References Cited

U.S. PATENT DOCUMENTS

| | | | |
|---|---|---|---|
| 2014/0040272 A1* | 2/2014 | Houghton | G06F 40/295 |
| | | | 707/740 |
| 2014/0067737 A1* | 3/2014 | Kapadia | G06Q 10/101 |
| | | | 706/20 |
| 2016/0110762 A1* | 4/2016 | Mastierov | G06Q 30/0204 |
| | | | 707/739 |
| 2016/0306876 A1* | 10/2016 | Nichols | G06F 16/345 |
| 2017/0060984 A1* | 3/2017 | Ben-Tzur | G06F 40/194 |
| 2017/0124487 A1 | 5/2017 | Szeto et al. | |
| 2017/0236032 A1* | 8/2017 | Lin | G06F 16/51 |
| | | | 382/159 |
| 2017/0300565 A1* | 10/2017 | Calapodescu | G06F 16/278 |

OTHER PUBLICATIONS

Extended European Search Report in European Appln. No. EP18867221.6, dated Jul. 7, 2020, 8 pages.

\* cited by examiner

HIERARCHICAL CLASSIFICATION OF TRANSACTION DATA

TECHNICAL FIELD

This disclosure relates generally to transaction data processing.

BACKGROUND

Transaction data can include transaction records describing transactions between service providers and customers or between service providers and service providers. The service providers can include, for example, stores, hospitals, or financial institutions. The customers can include, respectively for example, shoppers, patients, or bank customers. A transaction record describing a transaction can convey to an end user, e.g., a customer or a data analyzer, nature of the transaction. For example, a merchant sales related transaction can have details such as the name of the merchant, the location of the merchant, the mode of payment and so on. Similarly, a cash withdrawal related transaction would have details such as the card details, ATM number, ATM location and so on. These details can manifest in the transaction record in a cryptic shortened format to save space and compute power. For example, "Walmart Inc." may be shortened to "wmart" or some other form. Devices generating the transaction records may be different from one another. Accordingly, even for a same service provider, information such as a service provider's name or address may be shortened in different ways by different devices. The irregular nature of the shortening may pose a challenge to a data mining system.

SUMMARY

Techniques of hierarchically classifying transaction data using tag sequence clustering are disclosed. A hierarchical classification system receives training data including labeled transaction records. The hierarchical classification system determines tag sequences from the training data. The hierarchical classification system clusters the tag sequences into clusters. The hierarchical classification system determines a cluster-level classifier that is trained to predict a cluster for an input transaction record. The hierarchical classification system determines a respective cluster-specific classifier for each cluster. The hierarchical classification system trains the cluster-specific classifier to predict a label of entity of interest for an input transaction record, given a particular cluster. Upon receiving a test transaction record, the hierarchical classification system first applies the cluster-level classifier to determine a particular cluster for the test transaction record, and then determines a label of an entity of interest of the test transaction record by applying a cluster-specific classifier of that particular cluster. The hierarchical classification system then provides a representation of the test transaction record in association with the label of entity of interest to a data consuming device for processing or storage.

The features described in this specification can be implemented to achieve one or more advantages over conventional data extraction and enhancement techniques. The disclosed techniques improves upon conventional data enhancement techniques in that the disclosed techniques can handle diverse data better. Data enhancement techniques can transform raw and cryptic records generated by various computers into easily understandable terms. Analyzing these descriptions has several downstream applications and has thus received considerable attention in the financial technology industry. Diverse data sources pose significant challenge to conventional data enhancement techniques.

Consider the example of a transaction of an ATM (automatic teller machine) cash withdrawal. A customer withdraws cash from an ATM machine. The ATM machine generates a transaction record that includes a description of the withdrawal. The description generated by the ATM machine, managed by a particular service provider, will have the same format irrespective of the time of the day, the identity of the user or the amount withdrawn. However, different ATM machines of different service providers may generate transaction records having different formats. The descriptions in these transaction records may be different from one another, but the descriptions generally have a limited degree of freedom. A complicating factor is that the "degrees of freedom" are machine-specific and there is no universal standard for these. For a conventional data enhancement, it is a daunting task to enumerate all possible variations. Even if a conventional data enhance system enumerates the variations, the associations may vary frequently, disrupting the system. For example, a service provider using certain Point-of-Sale (PoS) devices may shift from merchant A to merchant B, which is typical in merger and acquisition or changed partnerships/priorities. A merchant itself may change the underlying coding strategy of a PoS device. The disclosed techniques can handle these situations that are difficult or impossible to handle by a conventional data enhancement system.

The disclosed techniques, identifying various tags from transaction records accurately, can help service providers, e.g., financial institutions, provide aggregate information to the users on their earning or spending patterns and in turn recommend most relevant products, e.g., financial instruments. Organizations providing rewards programs can implement the disclosed techniques to help end users track their progress against specific goals.

While conventional data enhancement techniques analyze diverse descriptions in a one-shot manner, this disclosure provides for ways to perform the analysis in a hierarchical manner. Specifically, the disclosed techniques include first identifying a likely structural cluster that a description in a given transaction record fits into, and then using a prediction mechanism specific to that structural cluster to predict exact labels. The disclosed approach is more flexible and more accurate than conventional approaches.

The details of one or more implementations of the disclosed subject matter are set forth in the accompanying drawings and the description below. Other features, aspects and advantages of the disclosed subject matter will become apparent from the description, the drawings and the claims.

DETAILED DESCRIPTION

Figure 1:
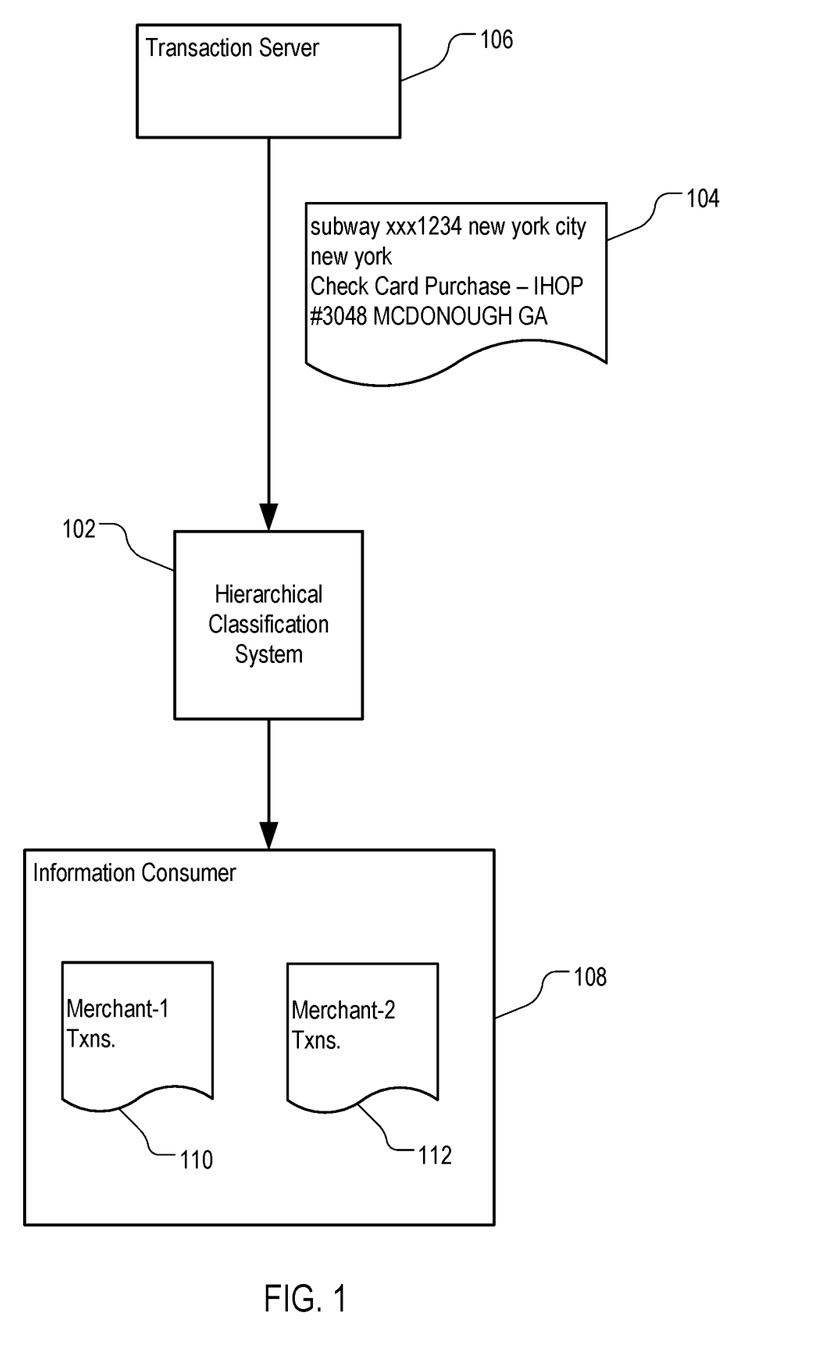
FIG. 1 is a block diagram illustrating an example hierarchical classification system processing transaction records having diverse descriptions.

FIG. 1 is a block diagram illustrating an example hierarchical classification system 102 processing transaction records having diverse descriptions. The hierarchical classification system 102 includes one or more processors programmed to perform data classification operations. The hierarchical classification system 102 can be implemented on one or more server computers, e.g., on a cloud-based computing platform.

The hierarchical classification system 102 receives transaction data 104 from a transaction server 106. The transaction data 104 includes one or more transaction records. A transaction can be an instance of interaction between a first user and a second user (e.g., between two humans), a user and a computer (e.g., a user and a PoS device at a financial institute), or a first computer and a second computer (e.g., a PoS device and a bank computer). The transaction data 104 is collected and stored by the transaction server 106.

The transaction server 106 includes one or more storage devices storing the transactional data 104. Examples of a transaction server 106 include a log server, an action data store, or a general ledger managing computer of various service providers. The service providers can include, for example, an interactive content provider, e.g., a news provider that allows readers to posts comments; an on-line shop that allows users to buy goods or services, e.g., prescription medicine or pet food, a healthcare network that serves new and existing patients, or a financial services provider, e.g., a bank or credit card company that tracks financial transactions.

Each record in the transaction data 104 can have a series of tokens. Each token, also referred to as a word, is a text segment separated from other text segments by a delimiter, e.g., a space. In the example shown, a first transaction record in the transaction data 104 has the following tokens, as shown in transaction record (1) below.

subway xxx1234 new york city new york    (1)

The tokens are "subway," "xxx1234," "new," "york," "city," another "new" and another "york."

These tokens correspond to pieces of information, referred to as tags in this specification, that represent various aspects of a corresponding transaction. Each tag can be an abstraction of a token. A tag includes a description of the kind of information that a token represents. For example, each of the second "new" and the second "york" tokens can correspond to a tag <state>. For transaction record (1), the hierarchical classification system 102 can identify the following tags, as shown in tag sequence (2) below.

<merchant-name><card-num><city><city><city><state><state>    (2)

The tags include a first tag <merchant-name> corresponding to a token "subway" that represents a merchant name; a second tag <card-num> corresponding to a token "xxx1234" that represents a financial card number; three <city> tags corresponding to tokens "new," "york" and "city" respectively, representing a city of the transaction; and two <state> tags corresponding to the second "new" and the second "york" representing a State of the transaction. In this specification, a merchant, also referred to as a vendor, is a service provider that operates one or more devices that generate one or more transaction records. A merchant can be an end entity that sells goods or services, or an intermediary, e.g., a payment card processing vendor, that operates the one or more devices for another merchant.

The transaction data 104 can come from various sources. In the example shown, a first transaction record in the transaction data 104 originated from a purchase at a first merchant, e.g., a Subway restaurant, and a second transaction in the in the transaction data 104 originated from a purchase at a second merchant, e.g., an IHOP restaurant. Different merchants, or different branches of a same merchant, may use different devices to generate, store or transmit transaction records. The transaction records can have different formats. The transaction records may include new tokens that are never known to the hierarchical classification system 102 before.

The hierarchical classification system 102 can label entities of interest in the transaction records, even when formats of the transaction records differ from one another. Labeling entities can include, for example, assigning a label of proper name, e.g., International House of Pancakes, to one or more tokens in a record (e.g., "IHOP") in a transaction record.

The hierarchical classification system 102 performs the labeling in multiple stages. In a first stage, the hierarchical classification system 102 predicts a respective cluster for each transaction record. A cluster can include a group of similar tag sequences that is determined through prior training. A tag sequence is a particular sequence, e.g., <merchant-name><city><state>, in which tags appear. The hierarchical classification system 102 treats the order of the tags in a sequence as grammar governing the sequence, and finds similar tag sequences upon determining that the tag sequences follow similar grammar. In the example shown, the hierarchical classification system 102 may predict a first cluster for the transaction record describing the first merchant transaction, and predict a second cluster for the transaction record describing the second merchant transaction.

In a second stage, the hierarchical classification system 102 predicts a label for an entity of interest using a respective cluster-specific classifier that corresponds to each cluster. In the second stage, the hierarchical classification system 102 can predict the label for a transaction record that the hierarchical classification system 102 has not seen before.

The hierarchical classification system 102 provides the labeled transaction data to an information consumer 108 for further processing. The labeled transaction data can include transaction records in a first group 110 that correspond to a first label, e.g., "Subway, Inc." The labeled transaction data can include transaction records in a second group 112 that correspond to a second label, e.g., "International House of Pancakes." The information consumer 108 can include one or more computing devices configured to enrich the transaction data and perform various analysis, e.g., total sales of a particular merchant, grouped by State. Unlike conventional grouping technologies, e.g., relational databases, that require structured data, e.g., database tables with columns and rows, the multi-stage, hierarchical classification disclosed in this specification can allow the information consumer 108 to perform various grouping calculations on unstructured and sometimes cryptically shortened text. Additional details on the hierarchical classification are described below in reference to FIG. 3.

Figure 2:
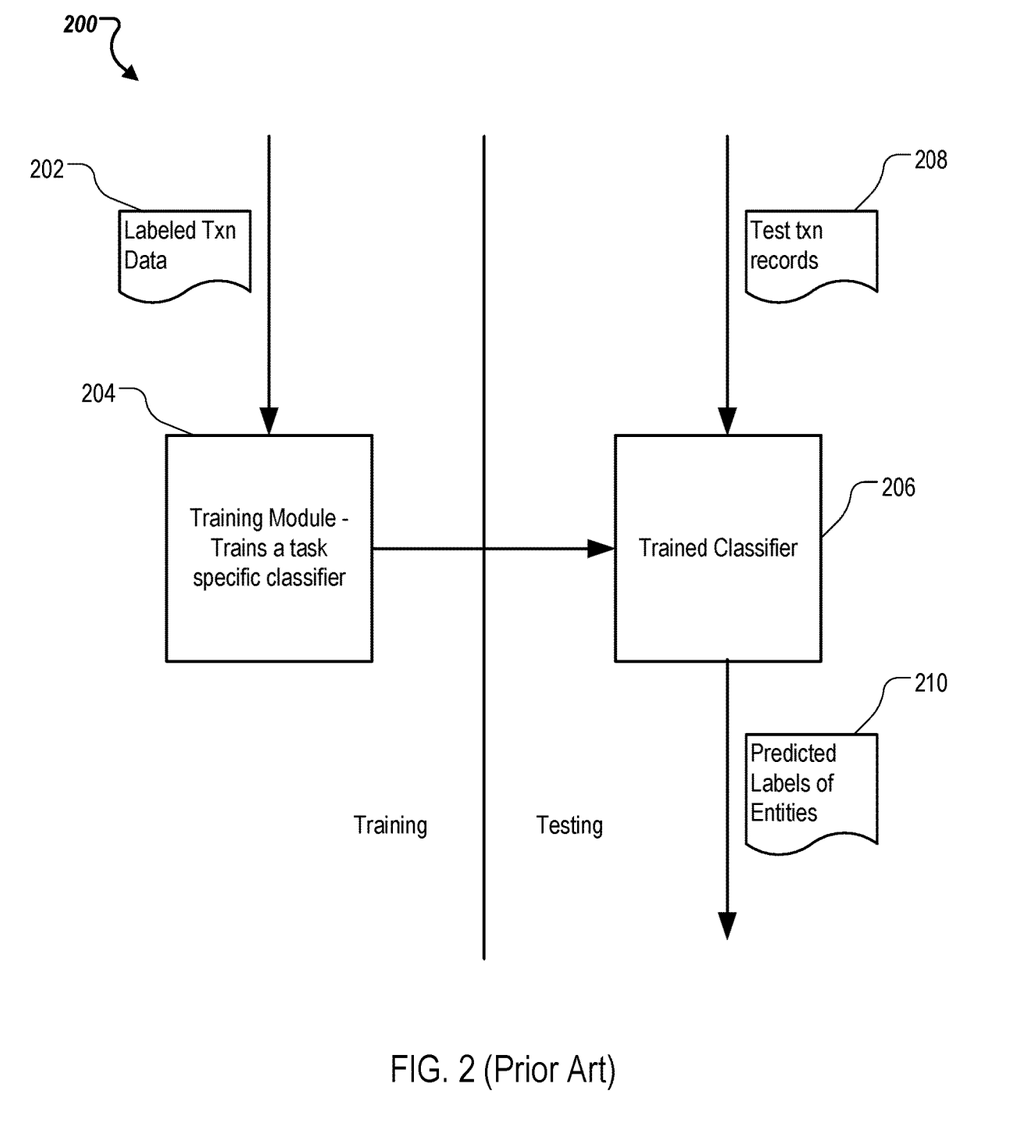
FIG. 2 is a block diagram illustrating a conventional data classification system.

FIG. 2 is a block diagram illustrating a conventional data classification system 200. The data classification system 200 provides a "one-shot" solution that is based on supervised learning. The solution includes a training phase and a testing phase. In training, the data classification system 200 receives labeled transaction data 202. The labeled transaction data 202 includes transaction records and corresponding labels. Each transaction record can be associated with one or more labels provided through a user interface accepting human input. For example, in the labeled transaction data 202, a token "subw" in a transaction record can be labeled as "Subway, Inc."

The data classification system 200 includes a training module 204 that is configured to train a task-specific classifier 206. The training can include a machine-learning process. The task-specific classifier 206 is "one-shot" in that the task-specific classifier 206 is configured to correspond to a specific task, e.g., identifying merchant names, and is configured to be applicable to an entire dataset. The task-specific classifier 206 is configured to attempt to handle any complexity.

In testing, the data classification system 200 receives test transaction records 208. In this specification, both transaction records provided for testing purposes and actual transaction records from merchants are referred to as test transaction records, in contrast to training data. The test transaction records 208 can include free-style text descriptions of transactions, e.g., transaction records provided from a service provider. The task-specific classifier 206 then predicts labels of entities and provides the predicted labels 210 of entities of interest to an information consumer.

Figure 3:
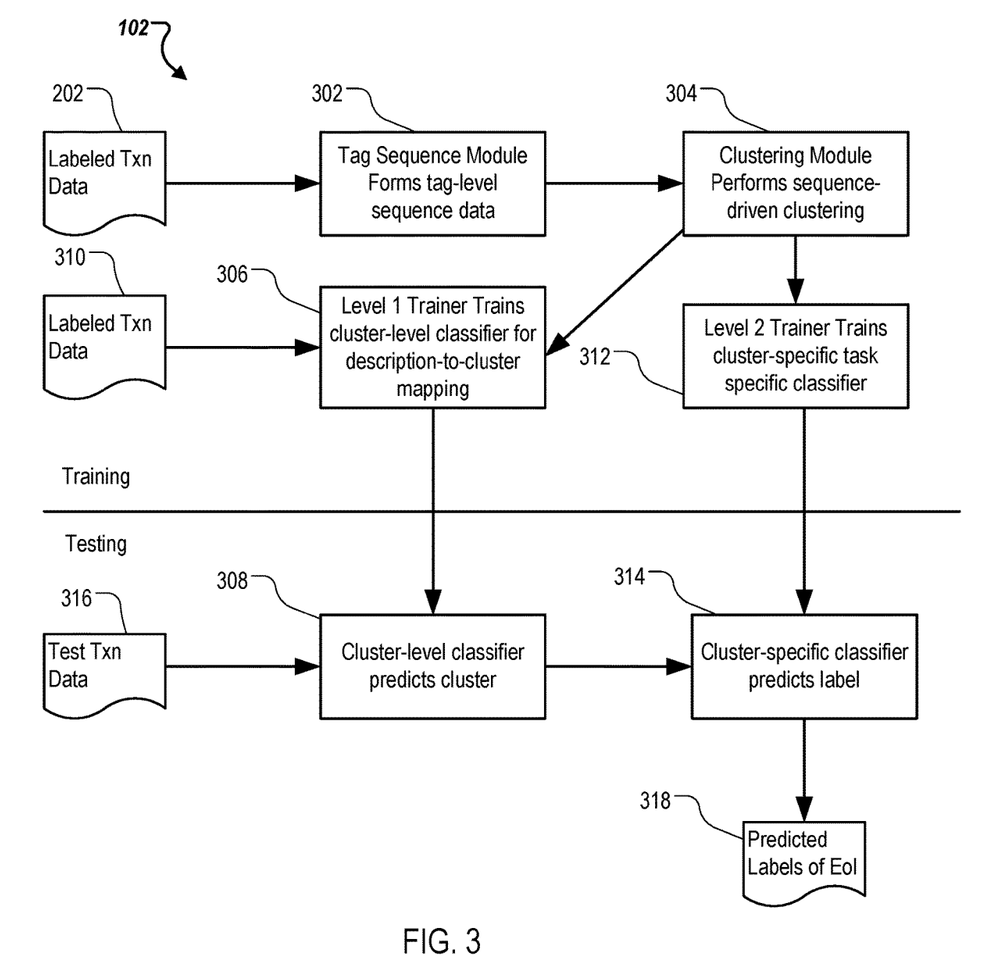
FIG. 3 is a block diagram illustrating functional modules of an example hierarchical classification system.

FIG. 3 is a block diagram illustrating functional modules of an example hierarchical classification system 102. Each functional module can be implemented on one or more computers having processors and non-transitory storage devices.

The hierarchical classification system 102 includes a training part and a testing part. For the training part, the hierarchical classification system 102 includes a tag sequence module 302. The tag sequence module 302 is configured to receive labeled transaction data 202 and form tag-level sequence data.

The labeled transaction data 202 can include the following example transaction records from different sources, source A and source B. The transaction records includes one or more series of tokens. Tokens are separated by delimiters. In the example shown, the delimiters include one or more spaces.

Source-A: subway xxx1234 new york city new york
 Source-A: mom & pop store xxx2344 boston georgia
 Source-B: check card purchase wal mart xxx8989 college park maryland
 Source-B: Check Card Purchase—IHOP #3048 MCDONOUGH GA
 Listing 1. Received Transaction Records Human input can label each token with a respective tag that indicates a meaning of that token. The tags form a sequence that corresponds to the sequence of the tokens. For the example transaction records in Listing 1, the tag sequences are shown below in Listing 2.

Source-A: subway xxx1234 new york city new york
 Tags: <merchant-name><card-num><city><city><city><state><state>
 Source-A: mom & pop store xxx2344 boston georgia
 Tags: <merchant-name><merchant-name><merchant-name><merchant-name><card-num><city><state>
 Source-B: check card purchase wal mart xxx8989 college park maryland
 Tags: <constant><constant><constant><merchant-name><merchant-name><card-num><city><city><state>
 Source-B: Check Card Purchase—IHOP #3048 MCDONOUGH GA
 Tags: <constant><constant><constant><merchant-name><store-ID><city><state>
 Listing 2. Example Tag Sequences The tag sequence module 302 receives the labeled transaction records including the tag sequences as input. The tag sequence module 302 can recognize that, although the two example tag sequences from Source A have different tags, the two tag sequences are structurally the same. To recognize that two apparently dissimilar tag sequences are structurally the same, the tag sequence module 302 can condense each tag sequence by merging two consecutive tags that are the same as one another into a single tag. Example output of the tag sequence module 302 including the condensed tag sequences, based on example labeled transaction data 202 as shown in Listing 1, is shown below in Listing 3.

Source-A: subway xxx1234 new york city new york
 Tags: <merchant-name><card-num><city><state>
 Source-A: mom & pop store xxx2344 boston georgia
 Tags: <merchant-name><card-num><city><state>
 Source-B: check card purchase wal mart xxx8989 college park maryland
 Tags: <constant><merchant-name><card-num><city><state>
 Source-B: Check Card Purchase—IHOP #3048 MCDONOUGH GA
 Tags: <constant><merchant-name><store-ID><city><state>
 Listing 3. Example Condensed Tag Sequences The tag sequence module 302 can obtain a group of condensed tag sequences from a large number (e.g., millions) of labeled transaction records 202. Each condensed tag sequence can represent a grammatical structure of tokens in one or more transaction records. The tag sequence module 302 then provides the condensed tag sequences to a clustering module 304 for clustering.

The clustering module 304 is a component of the hierarchical classification system 102 configured to perform sequence-driven clustering on the condensed tag sequences. The clustering can result in multiple tag sequence clusters. Generally, a tag sequence cluster can correspond to a respective source. Different sources may arrange tags in different sequence order. Different sources may arrange tags in different sequence order. Clustering based on tag sequences can segregate different sources. In addition, variations within a single source, e.g., transaction descriptions from a same source that differ for various reasons, can be represented by different tag sequence clusters. The segregation is advantageous over conventional "one-shot" classification. This is at least because indicators of sources, e.g., source identifiers, may not be always present in transaction records. In addition, a single source may use multiple sequence generating codes based on factors not necessarily captured in the transaction records. Conventional classification may not be able to distinguish different sources when the indicators of sources are lacking. The disclosed hierarchical classification techniques can handle such situations better.

To cluster the tag sequences, the clustering module 304 determines a number k of estimated sources. Determining the number of estimated sources can be based on metadata indicating source type included in the labeled transaction records 202. Alternatively or additionally, determining the number of estimated sources can be based on human input.

The clustering module 304 then executes a k-means clustering algorithm on the received tag sequences, where the parameter k is the number of estimated sources. During clustering, the clustering module 304 represents each tag sequence received from the tag sequence module 302 as a respective data instance. The clustering module 304 can define distances between data instances by calculating a Levenshtein distance at tag level. In particular, in some example implementations, a distance between a first tag sequence s and a second tag sequence t is the number of deleted tags, inserted tags, or substitute tags required to transform s into t.

For example, the clustering module can determine that a distance between a first tag sequence <constant><merchant-name><city><state> and a second sequence <merchant-name><card-num><city><state> is two, since deleting the tag <constant> from and inserting the <card-num> tag into the first tag sequence can result in the second tag sequence. The clustering module 304, upon determining the clusters in the tag sequences, can store a representation of the clusters for handling any tasks.

The hierarchical classification system 102 includes a first level trainer 306. The first level trainer 306 is a component of the hierarchical classification system 102 configured to train a cluster-level classifier 308. The cluster-level classifier 308 is a component of the hierarchical classification system 102 that is configured to receive raw transaction data including transaction records as input, and predicts a respective cluster for each transaction record as output. The first level trainer 306 trains the cluster-level classifier 308 using supervised learning, based on labeled transaction records 310. The labeled transaction records 310 can include transaction records and respective clusters designated by a human. In some implementations, the cluster-level classifier 308 can be a character-level Recurrent Neural Network (RNN) classifier.

The hierarchical classification system 102 includes a second level trainer 312. The second level trainer 312 is a component of the hierarchical classification system 102 that is configured to train one or more cluster-specific classifiers 314. A cluster-specific classifier 314 receives transaction records and associated clusters as input and produces predicted labels as output. A cluster-specific classifier 314 can be more precise and effective than a generalized "one-shot" classifier such as the classifier 206 of FIG. 2 due to the additional cluster-level information. The second level trainer 312 can train the one or more cluster-specific classifiers 314 based on supervised learning.

For the testing part, the hierarchical classification system 102 can receive test transaction data 316. The test transaction data 316 can include real-time or pre-stored transaction records received from one or more transaction servers, e.g., the transaction server 106 of FIG. 1. The cluster-level classifier 308 predicts a respective cluster for each transaction record, and provides the transaction records and predicted clusters to the one or more cluster-specific classifiers 314. The one or more cluster-specific classifiers 314 then predict one or more labels of entities of interest 318 from the transaction records and the predicted clusters.

The hierarchical classification system 102 may determine that a particular test transaction record does not include any token that was seen in any training data such as the labeled transaction data 202 and 310. In such case, the hierarchical classification system 102 can predict a cluster of the particular test transaction record based on a source identifier, if one is present in the particular test transaction record. The hierarchical classification system 102 examines the representation of clusters to identify a particular cluster that has the most members from that source identifier. The hierarchical classification system 102 then predicts that the particular test transaction record belongs to that cluster. If the hierarchical classification system 102 does not find a source identifier from the particular test transaction record, the particular test transaction record can predict a label of entity of interest for that particular test transaction record using a conventional classifier, such as the classifier 206 of FIG. 2.

Figure 4:
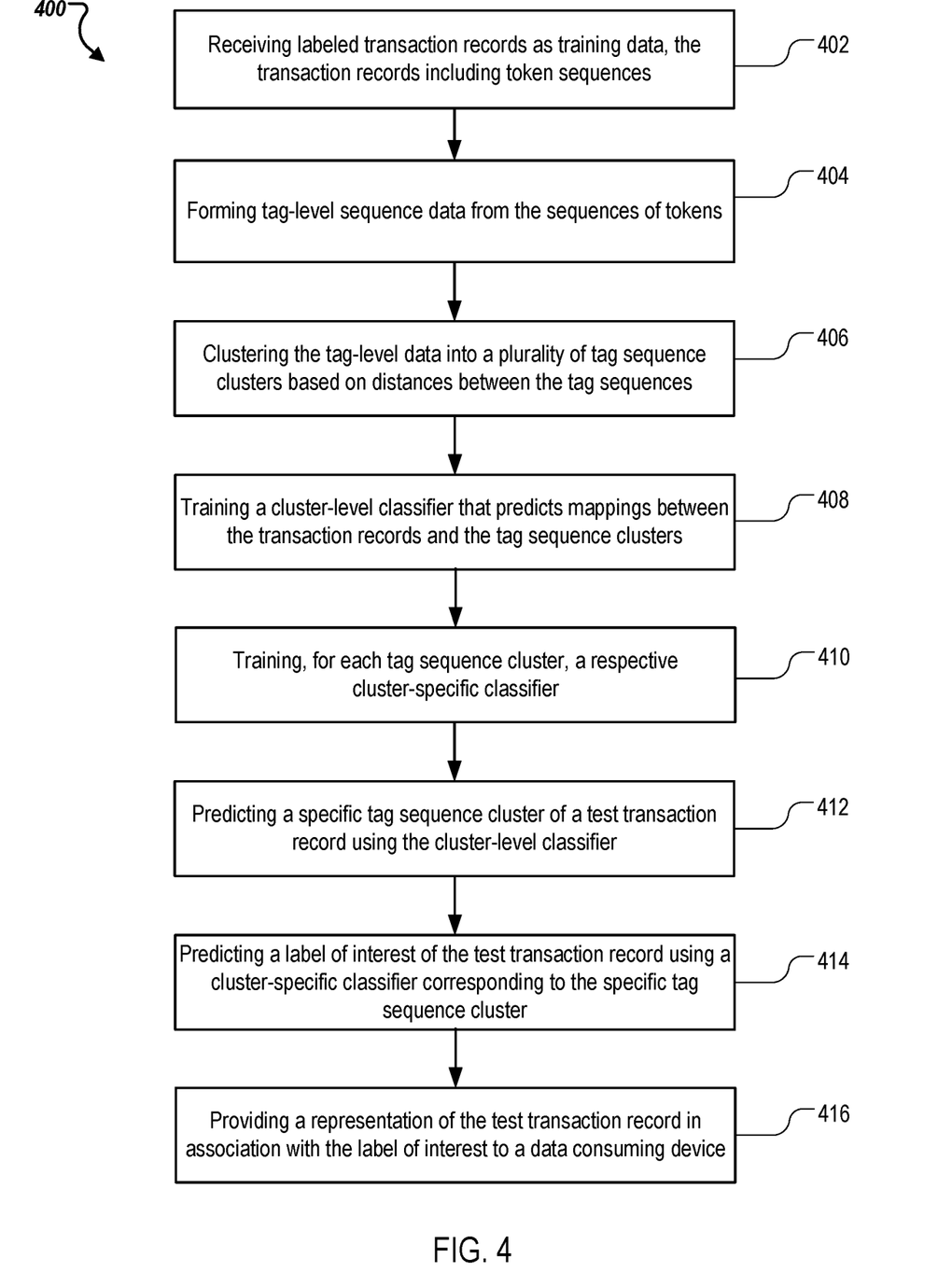
FIG. 4 is a flowchart illustrating an example process of hierarchical data classification.

FIG. 4 is a flowchart of an example process 400 of layered content masking. The process 400 can be performed by a system including one or more processors, e.g., the hierarchical classification system 102 of FIG. 1.

The system, in a training phase, receives (402) labeled transaction records as training data. The transaction records includes token sequences. The token sequences are labeled with raw tags. Each raw tag is an abstraction of one respective token in the transaction descriptions. The raw tags and the tokens have a one-to-one relationship.

The system forms (404) tag-level sequence data from the sequences of tokens in the labeled transaction records. The tag-level sequence data including tag sequences corresponding to the token sequences. Each tag in the tag sequences is a respective abstraction of one or more tokens. Forming the tag-level sequence data can include condensing the tags, including merging multiple consecutive raw tags that are the same as one another into one tag in the tag-level sequence data. Accordingly, the tags in tag-level sequence data are condensed tags that may have a one-to-many relationship with the tokens.

The system clusters (406) the tag-level data into multiple tag sequence clusters based on distances between the tag sequences. Clustering the tag-level data can include computing tag-level Levenshtein distances between tag sequences and clustering the tag sequences based on the tag-level Levenshtein distances using k-means clustering. A value of the parameter k in the k-means clustering corresponds to an estimated number of clusters in the labeled transaction descriptions.

The system trains (408) a cluster-level classifier that predicts mappings between the transaction records and the tag sequence clusters. Training the cluster-level classifier can include training a character-level RNN classifier using labeled transaction descriptions.

The system trains (410), for each tag sequence cluster, a respective cluster-specific classifier that predicts mappings between the transaction records in the respective tag sequence cluster into one or more labels of interests.

In a testing phase, the system receives a test transaction record. The testing phase also refers to a phase where actual transaction data is processed. The test transaction record includes a representation of a description from a service provider computer. The description can describe a financial transaction between the service provider and a customer or between the service provider and another service provider.

The system predicts (412) a specific tag sequence cluster of the test transaction record using the cluster-level classifier, e.g., the cluster-level classifier 308 of FIG. 3.

The system predicts (414) a label of interest of the test transaction record using a cluster-specific classifier corresponding to the specific tag sequence cluster. Each label of interests includes at least one of a service provider name, a service provider address, a transaction location, or a transaction date.

Figure 5:
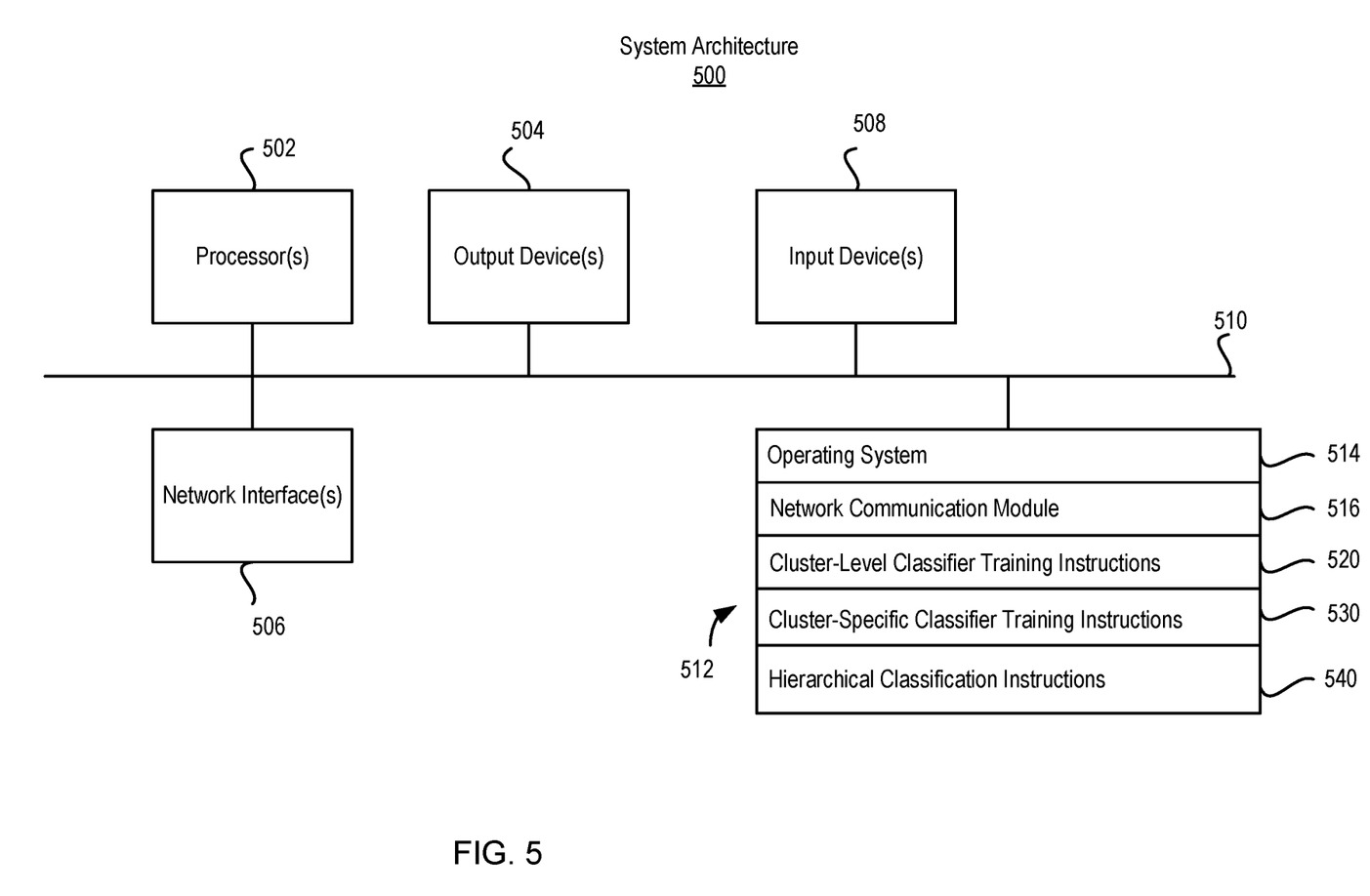
FIG. 5 is a block diagram illustrating an example system architecture for implementing the features and operations described in reference to FIGS. 1-4.

The system then provides (416) a representation of the test transaction record in association with the label of interest to a data consuming device for storage or data processing Exemplary System Architecture FIG. 5 is a block diagram of an example system architecture for implementing the systems and processes of FIGS.

1-4. Other architectures are possible, including architectures with more or fewer components. In some implementations, architecture 500 includes one or more processors 502 (e.g., dual-core Intel® Xeon® Processors), one or more output devices 504 (e.g., LCD), one or more network interfaces 506, one or more input devices 508 (e.g., mouse, keyboard, touch-sensitive display) and one or more computer-readable mediums 512 (e.g., RAM, ROM, SDRAM, hard disk, optical disk, flash memory, etc.). These components can exchange communications and data over one or more communication channels 510 (e.g., buses), which can utilize various hardware and software for facilitating the transfer of data and control signals between components.

The term "computer-readable medium" refers to a medium that participates in providing instructions to processor 502 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 512 can further include operating system 514 (e.g., a Linux® operating system), network communication module 516, cluster-level classifier training instructions 520, cluster-specific classifier training instructions 530 and hierarchical classification instructions 540. Operating system 514 can be multi-user, multiprocessing, multitasking, multithreading, real time, etc. Operating system 514 performs basic tasks, including but not limited to: recognizing input from and providing output to devices 506, 508; keeping track and managing files and directories on computer-readable mediums 512 (e.g., memory or a storage device); controlling peripheral devices; and managing traffic on the one or more communication channels 510. Network communications module 516 includes various components for establishing and maintaining network connections (e.g., software for implementing communication protocols, such as TCP/IP, HTTP, etc.).

Cluster-level classifier training instructions 520 can include computer instructions that, when executed, cause processor 502 to perform functions of training a cluster-level identifier, including receiving labeled transaction data, forming tag sequences, clustering the tag sequences into clusters, storing a representation of the clusters, and training a cluster-level classifier. Cluster-specific classifier training instructions 530 can include computer instructions that, when executed, cause processor 502 to train a respective cluster-specific classifier for each of the clusters. Hierarchical clustering instructions 540 can include computer instructions that, when executed, cause processor 502 to receive a transaction record, predict a cluster for the transaction record using a cluster-level classifier, and then predict a label of the transaction record using a cluster-specific classifier corresponding to that cluster.

Architecture 500 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:
   receiving labeled transaction records as training data, the transaction records including token sequences;
   forming, from a set of tags each representing a respective different aspect of the transaction records, tag-level sequence data from the token sequences, the tag-level sequence data including tag sequences corresponding to the token sequences, wherein for each tag sequence, each tag in the tag sequence is an abstraction of one or more respective tokens in the corresponding token sequence;
   clustering the tag-level sequence data into a plurality of tag sequence clusters based on distances between the tag sequences, wherein the distances between tag sequences are determined at least in part based on an ordering of the tags in the tag sequences;
   training a cluster-level classifier that predicts mappings between i) the transaction records and ii) the tag sequence clusters;
   training a plurality of cluster-specific classifiers, wherein:
   each cluster-specific classifier corresponds to a respective tag sequence cluster, and
   each cluster-specific classifier corresponding to a respective tag sequence cluster predicts mappings between i) transaction records that have been classified by the cluster-level classifier as belonging to the respective tag sequence cluster and ii) one or more labels of interests, wherein each cluster-specific classifier is configured to generate labels of interest characterizing the same aspect of the transaction records;
   receiving a test transaction record;
   predicting a particular tag sequence cluster of the test transaction record using the cluster-level classifier;
   determining, from the plurality of cluster-specific classifiers, a particular cluster-specific classifier that corresponds to the particular tag sequence cluster;
   predicting a label of interest of the test transaction record using the determined particular cluster-specific classifier; and
   providing a representation of the test transaction record in association with the label of interest to a data consuming device for storage or data processing.

2. The method of claim 1, wherein:
   for each token sequence in the labeled transaction records, each token in the token sequence is labeled with a respective raw tag, and
   forming the tag-level sequence data comprises merging a plurality of consecutive raw tags that are the same as one another into one tag in the tag-level sequence data.

3. The method of claim 1, wherein clustering the tag-level sequence data comprises computing tag-level Levenshtein distances between tag sequences and clustering the tag sequences based on the tag-level Levenshtein distances using k-means clustering.

4. The method of claim 1, wherein training the cluster-specific classifier corresponding to the particular tag sequence cluster comprises training a character-level Recurrent Neural Network (RNN) classifier using labeled transaction records whose tag-level sequence data belongs to the particular tag sequence cluster.

5. The method of claim 1, wherein each label of interest includes a value for at least one of a service provider name, a service provider address, a transaction location, or a transaction date.

6. The method of claim 1, wherein the test transaction record includes a representation of a description from a service provider computer, the description describing a financial transaction between the service provider and a customer or between the service provider and another service provider.

7. The method of claim 1, wherein:
   the ordering of the tags in each tag sequence of the particular tag sequence cluster is the same.

8. The method of claim 1, wherein respective different aspects of the transaction records represented by the set of tags include one or more of a merchant name corresponding to the transaction record, a card number corresponding to the transaction record, a city corresponding to the transaction record, a state corresponding to the transaction record, or a store ID corresponding to the transaction record.

9. A system comprising:
   one or more computers; and
   one or more storage devices which store instructions that are operable, when executed by the one or more computers, to cause the one or more computers to perform operations comprising:

receiving labeled transaction records as training data, the transaction records including token sequences;

forming, from a set of tags each representing a respective different aspect of the transaction records, tag-level sequence data from the token sequences, the tag-level sequence data including tag sequences corresponding to the token sequences, wherein for each tag sequence, each tag in the tag sequences is an abstraction of one or more respective tokens of the corresponding token sequence;

clustering the tag-level sequence data into a plurality of tag sequence clusters based on distances between the tag sequences, wherein the distances between tag sequences are determined at least in part based on an ordering of the tags in the tag sequences;

training a cluster-level classifier that predicts mappings between i) the transaction records and ii) the tag sequence clusters;

training a plurality of cluster-specific classifiers, wherein:
  each cluster-specific classifier corresponds to a respective tag sequence cluster, and
  each cluster-specific classifier corresponding to a respective tag sequence cluster predicts mappings between i) transaction records that have been classified by the cluster-level classifier as belonging to the respective tag sequence cluster and ii) one or more labels of interests, wherein each cluster-specific classifier is configured to generate labels of interest characterizing the same aspect of the transaction records;

receiving a test transaction record;

predicting a particular tag sequence cluster of the test transaction record using the cluster-level classifier;

determining, from the plurality of cluster-specific classifiers, a particular cluster-specific classifier that corresponds to the particular tag sequence cluster;

predicting a label of interest of the test transaction record using the determined particular cluster-specific classifier; and providing a representation of the test transaction record in association with the label of interest to a data consuming device for storage or data processing.

10. The system of claim 9, wherein:
for each token sequence in the labeled transaction records, each token in the token sequence is labeled with a respective raw tag, and
forming the tag-level sequence data comprises merging a plurality of consecutive raw tags that are the same as one another into one tag in the tag-level sequence data.

11. The system of claim 9, wherein clustering the tag-level sequence data comprises computing tag-level Levenshtein distances between tag sequences and clustering the tag sequences based on the tag-level Levenshtein distances using k-means clustering.

12. The system of claim 9, wherein training the cluster-specific classifier corresponding to the particular tag sequence cluster comprises training a character-level Recurrent Neural Network (RNN) classifier using labeled transaction records whose tag-level sequence data belongs to the particular tag sequence cluster.

13. The system of claim 9, wherein each label of interest includes a value for at least one of a service provider name, a service provider address, a transaction location, or a transaction date.

14. The system of claim 9, wherein the test transaction record includes a representation of a description from a service provider computer, the description describing a financial transaction between the service provider and a customer or between the service provider and another service provider.

15. One or more non-transitory storage devices storing instructions that are operable, when executed by one or more computers, to cause the one or more computers to perform operations comprising:
receiving labeled transaction records as training data, the transaction records including token sequences;

forming, from a set of tags each representing a respective different aspect of the transaction records, tag-level sequence data from the token sequences, the tag-level sequence data including tag sequences corresponding to the token sequences, wherein for each tag sequence, each tag in the tag sequences being -is an respective abstraction of one or more respective tokens in the corresponding token sequence;

clustering the tag-level sequence data into a plurality of tag sequence clusters based on distances between the tag sequences, wherein the distances between tag sequences are determined at least in part based on an ordering of the tags in the tag sequences;

training a cluster-level classifier that predicts mappings between i) the transaction records and ii) the tag sequence clusters;

training a plurality of cluster-specific classifiers, wherein:
  each cluster-specific classifier corresponds to a respective tag sequence cluster, and
  each cluster-specific classifier corresponding to a respective tag sequence cluster predicts mappings between i) transaction records that have been classified by the cluster-level classifier as belonging to the respective tag sequence cluster and ii) one or more labels of interests, wherein each cluster-specific classifier is configured to generate labels of interest characterizing the same aspect of the transaction records;

receiving a test transaction record;

predicting a particular tag sequence cluster of the test transaction record using the cluster-level classifier;

determining, from the plurality of cluster-specific classifiers, a particular cluster-specific classifier that corresponds to the particular tag sequence cluster;

predicting a label of interest of the test transaction record using the determined particular cluster-specific classifier; and providing a representation of the test transaction record in association with the label of interest to a data consuming device for storage or data processing.

16. The one or more non-transitory storage devices of claim 15, wherein:
for each token sequence in the labeled transaction records, each token in the token sequence is labeled with a respective raw tag, and
forming the tag-level sequence data comprises merging a plurality of consecutive raw tags that are the same as one another into one tag in the tag-level sequence data.

17. The one or more non-transitory storage devices of claim 15, wherein clustering the tag-level sequence data comprises computing tag-level Levenshtein distances between tag sequences and clustering the tag sequences based on the tag-level Levenshtein distances using k-means clustering.

18. The one or more non-transitory storage devices of claim 15, wherein training the cluster-specific classifier corresponding to the particular tag sequence cluster comprises training a character-level Recurrent Neural Network (RNN) classifier using labeled transaction records whose tag-level sequence data belongs to the particular tag sequence cluster.

19. The one or more non-transitory storage devices of claim 15, wherein each label of interest includes a value for at least one of a service provider name, a service provider address, a transaction location, or a transaction date.

20. The one or more non-transitory storage devices of claim 15, wherein the test transaction record includes a representation of a description from a service provider computer, the description describing a financial transaction between the service provider and a customer or between the service provider and another service provider.

* * * * *

UNITED STATES PATENT AND TRADEMARK OFFICE
CERTIFICATE OF CORRECTION

| | | |
|---|---|---|
| PATENT NO. | : 11,379,501 B2 | |
| APPLICATION NO. | : 15/728461 | |
| DATED | : July 5, 2022 | |
| INVENTOR(S) | : Chirag Yadav et al. | |

It is certified that error appears in the above-identified patent and that said Letters Patent is hereby corrected as shown below:

In the Claims

Column 13, Line 8, in Claim 9, delete "sequences" and insert -- sequence -- therefor.

Column 14, Line 16, in Claim 15, delete "sequences being –is an respective" and insert -- sequence is an -- therefor.

Signed and Sealed this
Twentieth Day of September, 2022

*Katherine Kelly Vidal*

Katherine Kelly Vidal
*Director of the United States Patent and Trademark Office*